United States Patent Office 3,140,543
Patented July 14, 1964

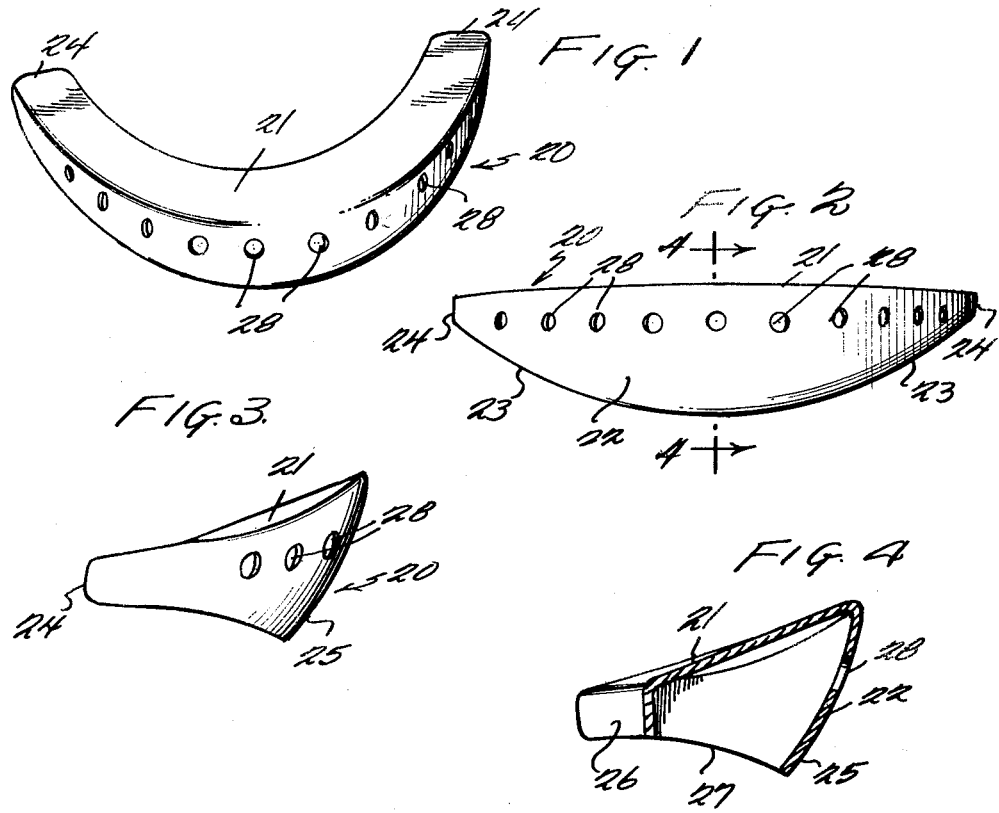
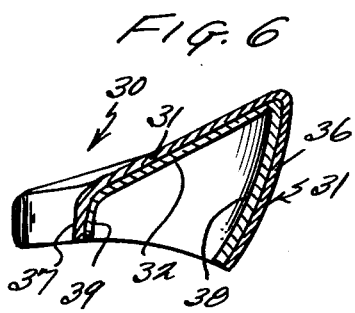
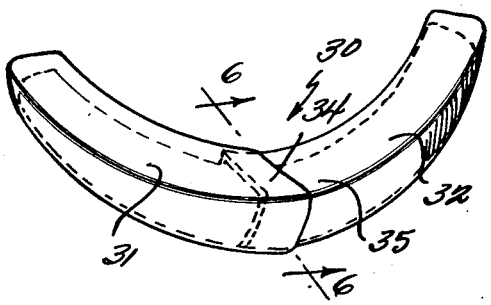

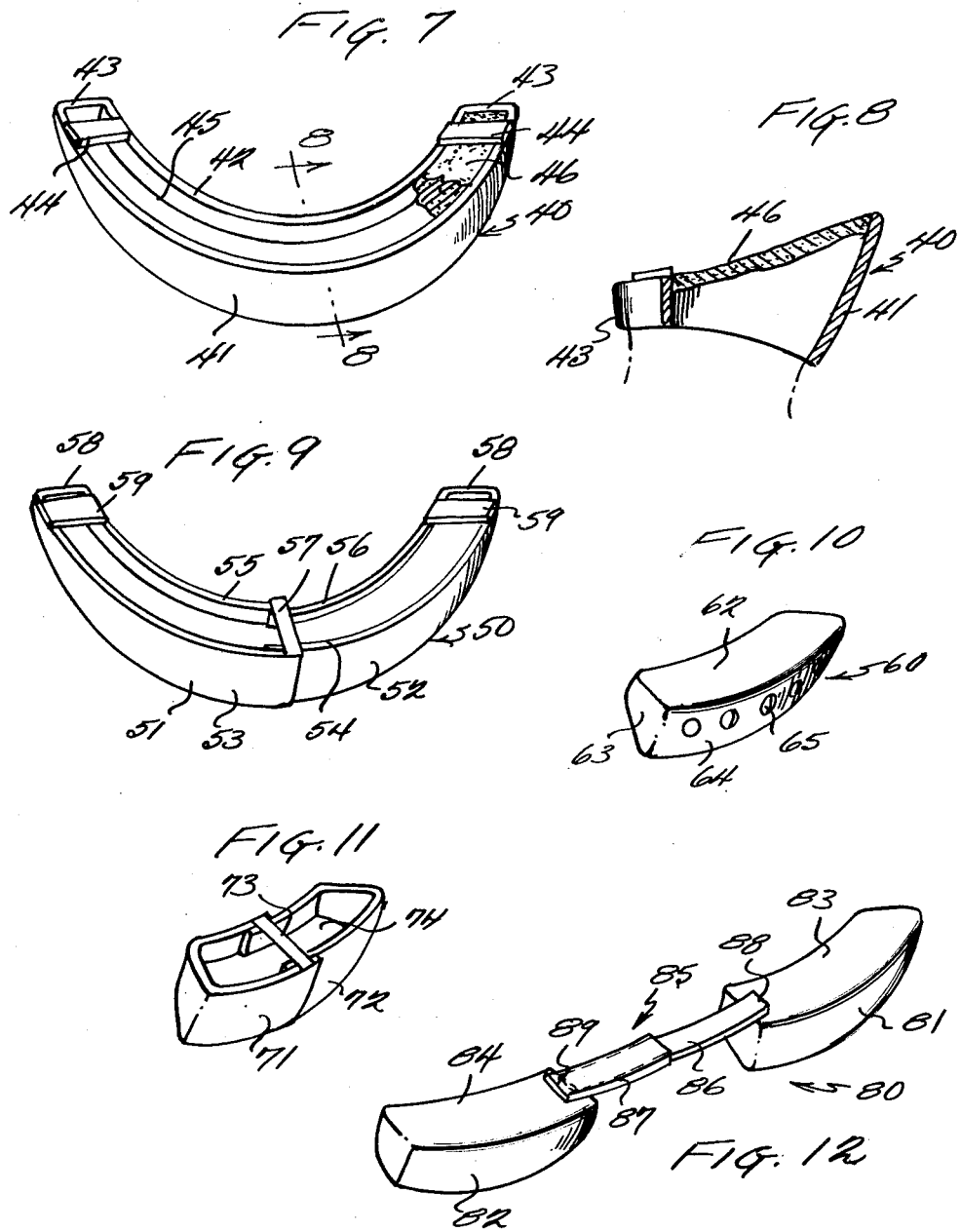

3,140,543
CROWN FOR BOVINE TEETH
Albion Rood Menter, Sedgwick, Colo.
Filed July 27, 1962, Ser. No. 212,873
12 Claims. (Cl. 32—12)

This invention relates to a crown for bovine teeth, and has as its primary object the provision of an improved protective metal cap or crown for positioning over the lower incisor teeth of grazing animals, such as cattle or sheep, to protect the teeth and stop the abrasion thereof occasioned by sand and hard grasses on the biting surface of the teeth.

The invention constitutes an improvement over my co-pending application Serial No. 189,238 filed April 17, 1962, which comprises a continuation-in-part of my previous application Serial No. 46,531, filed August 1, 1960, now abandoned, both applications being entitled "Crown for Bovine Teeth."

The invention is particularly applicable to preventive dentistry in the case of such animals as sheep or cattle which have no upper anterior incisors. As conducive to a clearer understanding of this invention, it may here be pointed out that the useful life of such a grazing animal as a cow, for example, depends in part upon the useful life of the anterior lower incisors of the animal. A cow, for example, possesses only eight teeth on her lower front jaw, which eight permanent teeth serve to crop the grass while the upper and lower molars masticate the food. If the animal grazes upon loose, sandy, or gritty soil, these anterior teeth wear down rapidly, and within a year or two will be worn down to such an extent that they are called pearlies or gummers, a pearlie or gummer being a tooth which embodies only a small part of the neck of a tooth and projects about a quarter of an inch above the gum. When the teeth reach this condition, the animal is approaching the end of its useful life, because, as a calf producer and calf feeder, she is unable to obtain enough food to support herself in healthy condition for such purposes. When the same cow is feeding on land of a different character wherein much less of the loose gritty material is present, the animal might live a much longer productive life. An important object of the invention is, therefore, the provision of a means in the form of a crown, adapted to be applied to the lower anterior incisor teeth of a cow, as a unit, and comprised of a relatively hard material such as stainless steel, which serves to preclude much of the wear or abrasion which would otherwise occur and thus prolong the useful life of the cow.

A specific object of the present invention is the provision of a cap or crown of this character which will serve to protect all of the lower anterior incisor teeth, and having a normal shape which corresponds to the general external contour of the row of lower anterior incisor teeth.

A further and more specific object of the invention is the provision of a device of this character which, in one form, is provided with a relatively solid upper surface, forming a complete protective barrier over the tops of the teeth.

An additional object of the invention is the provision of a device of this character in another form which is characterized by an open top surface, forming a peripheral rim about the group of lower anterior incisors and which serves as a hard protective surface. The ends of the open top may be provided with bars resting on the end teeth, and the open top may, if desired, be filled with mastic or the like to prevent the entry of cropped grass into the opening and the possibility of its lodging between the teeth and the rim and causing decay.

A still further object of the invention resides in the provision of such a device for covering a plurality of teeth which may be made adjustable, and in the form of a pair of telescopic elements, so that a selected number of teeth only may be covered.

A further specific object of the invention is the provision of a pair of crowns for one or more teeth connected by a bar, the crowns clamping over the end teeth to be protected, and the bar extending over the teeth therebetween, so as to provide a protective surface. In this form of the invention the bar also may be made telescopic to allow adjustment.

A further and more specific object of the invention is the provision of such a crown for a plurality of teeth which may be perforate on its labial face or imperforate as desired, and which is undercut, along its gingival edge as disclosed in our above-mentioned co-pending application so that it may be readily slipped over the teeth and then crimped in position as by means of pliers or the like.

A further object of the invention is the provision of a device of this character which may be secured by adhesive, as in the case of the individual crowns of the previously mentioned application.

Other objects will in part be obvious and in part be pointed out as the description of the invention proceeds, and shown in the accompanying drawing wherein there are disclosed preferred embodiments of this inventive concept.

In the drawing:

FIGURE 1 is a perspective view of one form of crown for a plurality of teeth constructed in accordance with the instant invention.

FIGURE 2 is a front elevational view of the crown of FIGURE 1.

FIGURE 3 is an end elevational view thereof.

FIGURE 4 is a sectional view taken substantially along the line 4—4 of FIGURE 2 as viewed in the direction indicated by the arrows.

FIGURE 5 is a view similar to FIGURE 1 but disclosing a telescopically adjustable modified form of crown.

FIGURE 6 is an enlarged sectional view taken substantially along the line 6—6 of FIGURE 5.

FIGURE 7 is a perspective view of a still further modified form of crown having an open top, and providing a peripheral rim about the teeth, the open top being adapted for filling with mastic or similar material if desired.

FIGURE 8 is a sectional view taken substantially along the line 8—8 of FIGURE 7.

FIGURE 9 is a view similar to FIGURE 7 but showing a telescopically adjustable modification thereof.

FIGURE 10 is a perspective view of a further modified form of the invention on a reduced scale and adapted only to protect certain teeth when necessary.

FIGURE 11 is a view similar to FIGURE 10 but showing a modified form of the invention which is telescopically adjustable; and FIGURE 12 is a perspective view of a still further modified form of the invention.

Similar reference characters refer to similar parts throughout the several views of the drawing.

Having reference now to the drawings in detail, and more particularly to the form of the invention disclosed in FIGURES 1 to 4, inclusive, there is shown a crown or restoration plate, generally indicated at 20, for bovine teeth. The plate consists of an elongated arcuate member of a size and configuration to encompass all of the lower anterior teeth of a cow or similar grazing animal and includes a flat top or occlusal surface 21 which is inclined rearwardly, as best shown in FIGURES 3 and 4 to conform to the normal occlusive surface of the animal's teeth. The crown has a front or labial portion 22 which tapers as at 23 from the center toward the ends, the ends being squared as at 24 to conform to the edge or end of the teeth. The labial portion 22 is inclined inwardly as at 25, to conform to the undercut portion of the animal's teeth, while the lingual or rear edge 26 is slightly inclined inwardly. The lower or gum engaging surface 27 of the crown is arcuate to conform in configuration to the gums of the animal. If desired, perforations 28 may be provided along the labial edge or front of the plate, although such perforations are not essential.

In the use and operation of this form of device the plate 20 is coated interiorly with suitable adhesive or cement and then placed over the entire anterior row of lower teeth of the animal, the lower or gingival edge of the labial face being crimped in position by pliers or other means, if desired, securely to hold the plate in position in the mouth of the animal.

The perforations 28 function to allow the cement or adhesive to seep therethrough before it hardens, particularly when the labial face is crimped by pliers as described hereinabove, to thereby increase the attachment between the teeth and the plate avoiding undesirable movement between the same after the cement hardens.

FIGURES 5 and 6 disclose a modified form of the invention which is generally indicated at 30 and comprises a crown or plate of a configuration generally similar to that disclosed in the foregoing modification. In this illustrative embodiment of the invention, however, the crown is comprised of two telescopically connected sections 31 and 32, with the occlusal edge 34 of section 31 overlying the occlusal edge 35 of the portion 32. The labial and lingual edges of the larger section 31, respectively designated at 36 and 37, similarly overly the corresponding edges 38 and 39 of the section 32. By virtue of this arrangement minor variations in length can be provided to fit the teeth of an individual animal with a minimum of play. The general configuration and taper of the occlusal, labial, lingual, and distal surfaces of crown or plate 30 are substantially identical to those of the previously described modification.

FIGURES 7 and 8 disclose a modified form of crown, generally indicated at 40, and including a labial edge 41 having an undercut configuration similar to that of the previously described modification and a similar lingual edge 42. However, the occlusal plate-like portion of the previous modifications is omitted in this form, and the distal or end portions 43 are provided with transversely extending bars 44 extending across the normally open top 45 of the plate. The attachment in this case is similar to that of the preceding modifications except that the inner edges of the labial and lingual plates are provided with adhesive and similarly crimped, the underside of bars 44 also being provided with cementaceous material as desired. In this form of the invention the top surface 45 may be left open, or may filled with suitable mastic 46 to prevent the entry of grass or similar material into the space between the plates 41 and 42 and the teeth of the animal.

In FIGURE 9 there is generally indicated at 50 a crown or plate which is substantially identical in configuration to that of FIGURE 7, but which is comprised of two telescopic sections 51 and 52 which operate in the same manner as the species of the invention shown in FIGURE 5. The labial wall 53 of section 52 telescopes over the similar labial wall 54 of section 52, as does the lingual wall 55 of section 51 over the lingual wall 56 of section 52. A transverse bar 57 extends between walls 53 and 55 of section 51 to insure proper retentive alignment. Distal ends 58 and end plates 59 are identical to the previously disclosed distal ends 43 in plates 44.

In FIGURE 10 there is shown a further modification of the device which is adapted to cover only a portion of the anterior lower teeth of the animal. This modification generally indicated at 60, is substantially identical in configuration to the modification described and shown in connection with FIGURE 1 and includes a relatively short occlusal surface 62, abbreviated distal ends 63, a labial surface 64, and a lingual surface (not shown) identical in general configuration to the lingual surface of the previously disclosed modification of FIGURE 1. Obviously, the curvature of this modification is not as great as that of the previously disclosed modifications, nor are the distal ends as narrow, since only the central teeth are designed to be protected. Perforations 65 may be provided similar to the perforations 28, if desired.

FIGURE 11 discloses a further modified form of the invention which is similar in size to that of the modification of FIGURE 10 but which includes telescopically engaging members 71 and 72 having an occlusal bar connection 73, and an open top 74. Except for size and arc, this modification is identical to that of FIGURE 9, and is used in a corresponding fashion to cover a relatively limited number of teeth.

FIGURE 12 discloses a further modification of the device, generally indicated at 80, and including two opposed end sections 81 and 82. These may be identical in configuration to the modification of FIGURE 10, including occlusal surfaces 83 and 84, the sections 81 and 82 being adapted to fit over two or more of the end teeth of the animal. In this modification a two-piece bar 85 includes sections 86 and 87 secured in any desired manner at their ends 88 and 89 to the occlusal surfaces 83 and 84. Section 86 telescopes within section 87, to permit adjustment or variation in size.

It will be obvious that the perforations 28 may be employed with the modifications of FIGURES 5, 9, 11, and 12, or correspondingly omitted from the modifications of FIGURES 1 and 10. Similarly, the modifications of FIGURES 10 and 12 may embody the telescopic assembly of FIGURE 11, while FIGURE 11 may be telescopic and provided with a solid occlusal surface as shown in FIGURE 5.

It is within the contemplation of the instant invention that any or all of these features shall be interchangeable.

From the foregoing it will now be seen that there is herein provided an improved crown or restoration plate for the lower anterior teeth of a grazing animal, which is adapted to protect simultaneously a plurality of such teeth, and to be applied thereto as a unit, and which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. A crown for the lower anterior teeth of a grazing animal comprising an arcuate member adapted to encompass a plurality of teeth including undercut labial and lingual plate portions connected at their distal ends, said labial and lingual plate portions having smooth interior surfaces in confronting relationship, said labial and lingual plate portions conforming in height to the vertical dimension of the teeth of the animal and the space between said labial and lingual plate portions conforming to the transverse dimension of the teeth of the animal.

2. A crown for the lower anterior teeth of a grazing animal comprising an arcuate member adapted to encompass a plurality of teeth including undercut labial and lingual plate portions connected at their distal ends, said labial and lingual plate portions having smooth interior surfaces in confronting relationship, said labial and lingual plate portions conforming in height to the vertical dimension of the teeth of the animal and the space between said labial and lingual plate portions conforming to the transverse dimension of the teeth of the animal, and an occlusal plate connected between the tops of said labial and lingual plate portions inclined downwardly toward the lingual plate portion to conform to the occlusal surface of the teeth of the animal.

3. A crown for the lower anterior teeth of a grazing animal comprising an arcuate member adapted to encompass a plurality of teeth including undercut labial and lingual plate portions connected at their distal ends, said labial and lingual plate portions conforming in height to the vertical dimension of the teeth of the animal and the space between said labial and lingual plate portions conforming to the transverse dimension of the teeth of the animal, the occlusal portion of said crown being open, and the labial and lingual plate portions being connected at their ends by transverse bars.

4. A crown for the lower anterior teeth of a grazing animal comprising an arcuate member adapted to encompass a plurality of teeth including undercut labial and lingual plate portions connected at their distal ends, said labial and lingual plate portions conforming in height to the vertical dimension of the teeth of the animal and the space between said labial and lingual plate portions conforming to the transverse dimension of the teeth of the animal, the occlusal portion of said crown being open, and the labial and lingual plate portions being connected at their ends by transverse bars, the open occlusal portion being filled with mastic.

5. The structure of claim 1 wherein said crown is comprised of two linearly telescopic portions for adjustability.

6. The structure of claim 2 wherein said crown is comprised of two linearly telescopic portions for adjustability.

7. The structure of claim 3 wherein said crown is comprised of two linearly telescopic portions for adjustability.

8. The structure of claim 1 wherein said labial plate portion is provided with a plurality of openings therein.

9. The structure of claim 2 wherein said labial plate portion is provided with a plurality of openings therein.

10. The strucure of claim 3 wherein said labial plate portion is provided with a plurality of openings therein.

11. A crown for the lower anterior teeth of a grazing animal comprising two sections adapted to engage over one or more of the teeth at each end of the row of lower anterior teeth, each section including undercut labial and lingual plate portions and an occlusal plate extending between at least the inner ends of said labial and lingual plate portions and an occlusal bar connecting said occlusal plates.

12. A crown for the lower anterior teeth of a grazing animal comprising two sections adapted to engage over one or more of the teeth at each end of the row of lower anterior teeth, each section including undercut labial and lingual plate portions and an occlusal plate extending between at least the inner ends of said labial and lingual plate portions and an occlusal bar connecting said occlusal plates, said bar comprising two telescopically connected elements.

References Cited in the file of this patent

UNITED STATES PATENTS 1,519,969    Bechtold _____ Dec. 16, 1924

FOREIGN PATENTS 686,547    Germany _____ Jan. 11, 1940